(12) United States Patent
Perry et al.

(10) Patent No.: US 8,225,599 B2
(45) Date of Patent: Jul. 24, 2012

(54) METHOD FOR SUPPLYING REDUCTANT TO AN AFTERTREATMENT SYSTEM

(75) Inventors: Kevin L. Perry, Fraser, MI (US); Thompson M. Sloane, Kewadin, MI (US); Jong H. Lee, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 344 days.

(21) Appl. No.: 12/713,353

(22) Filed: Feb. 26, 2010

(65) Prior Publication Data

US 2011/0209467 A1 Sep. 1, 2011

(51) Int. Cl.
*F01N 3/36* (2006.01)
(52) U.S. Cl. ............... 60/286; 60/274; 60/295; 60/301
(58) Field of Classification Search .............. 60/274, 60/286, 295, 297, 299, 301, 311
See application file for complete search history.

(56) References Cited

U.S. PATENT DOCUMENTS

| | | | | |
|---|---|---|---|---|
| 6,711,893 | B2* | 3/2004 | Ueda et al. | 60/285 |
| 2002/0023433 | A1* | 2/2002 | Goerigk et al. | 60/286 |
| 2007/0000239 | A1* | 1/2007 | Liu et al. | 60/286 |
| 2007/0068144 | A1* | 3/2007 | Iwase et al. | 60/286 |
| 2008/0098728 | A1* | 5/2008 | Winkler et al. | 60/286 |
| 2009/0173061 | A1* | 7/2009 | Vitse et al. | 60/287 |

OTHER PUBLICATIONS

U.S. Appl. No. 12/578,794, Mordukhovich.
Thomas, John F. "Hydrocarbon Selective Catalytic Reduction Using a Silver-Alumina Catalyst with Light Alcohols and Other Reductants" SAE Technical Paper Series. 2005 SAE World Congress Detroit, Michigan Apr. 11-14, 2005.
Kass, Michael D. "Selective Catalytic Reduction of NOx Emissions from a 5.9 Liter Diesel Engine Using Ethanol as a Reductant" SAE Paper No. 2003-01-1162 (2003).

* cited by examiner

*Primary Examiner* — Kenneth Bomberg
*Assistant Examiner* — Jorge Leon, Jr.

(57) ABSTRACT

A method for supplying reductant into an exhaust gas feedstream for an internal combustion engine includes storing a fuel/reductant blend in the fuel storage and delivery system, separating the reductant from the fuel/reductant blend, storing the reductant in a reductant storage tank, and injecting the reductant into the exhaust gas feedstream upstream of the aftertreatment device.

18 Claims, 5 Drawing Sheets

METHOD FOR SUPPLYING REDUCTANT TO AN AFTERTREATMENT SYSTEM

TECHNICAL FIELD

This disclosure is related to exhaust aftertreatment systems for internal combustion engines.

BACKGROUND

The statements in this section merely provide background information related to the present disclosure and may not constitute prior art.

Known combustion by-products in an exhaust gas feedstream include carbon monoxide (CO), oxides of nitrogen (NOx), and particulate matter (PM), among others. Unburned hydrocarbons (HC) are also present in engine-out emissions. Operating the engine at varying air/fuel ratios including rich, lean and stoichiometric ratios produce different proportions of the by-products and HC, e.g., increased NOx emissions during lean engine operation.

Lean of stoichiometry engine operation can improve fuel efficiency, but may require additional catalytic material to reduce or otherwise treat NOx emissions. Known aftertreatment systems for internal combustion engines operating lean of stoichiometry can include a three-way catalytic converter followed by a lean-NOx reduction catalyst, also referred to as a lean NOx trap (LNT device), which can be used in concert with other exhaust aftertreatment devices, e.g., a selective catalytic reduction catalytic device (SCR device). Known three-way catalytic converters (TWC) function to reduce engine-out HC, CO, and NOx emissions during stoichiometeric engine operation. However, aftertreatment devices including the LNT device and the SCR device can require reductants to reduce NOx molecules within the exhaust gas feedstream during lean engine operation.

A known method for supplying reductant to the aftertreatment system includes injecting reductants into the aftertreatment system, e.g., a hydrocarbon selective catalytic reduction system (HC—SCR). Hydrocarbon reductants typically require a 10:1 reductant to NOx ratio in the exhaust gas feedstream for NOx reduction. Oxygenated hydrocarbon reductants, e.g., ethyl alcohol-based, however, require a 5:1 reductant to NOx ratio for NOx reduction. Ammonia based reductant systems can require a reductant storage tank on the vehicle with periodic refilling and may be prone to freezing in cold climates requiring additional heaters and insulation. Another known method to supply reductant includes configuring the TWC to produce ammonia during engine operation. This method requires a control scheme to alter an air/fuel ratio for combustion in the engine thereby reducing fuel efficiency.

SUMMARY

A method for supplying reductant into an exhaust gas feedstream for an internal combustion engine includes storing a fuel/reductant blend in the fuel storage and delivery system, separating the reductant from the fuel/reductant blend, storing the reductant in a reductant storage tank, and injecting the reductant into the exhaust gas feedstream upstream of the aftertreatment device.

BRIEF DESCRIPTION OF THE DRAWINGS

One or more embodiments will now be described, by way of example, with reference to the accompanying drawings, in which.

DETAILED DESCRIPTION

Figure 1:
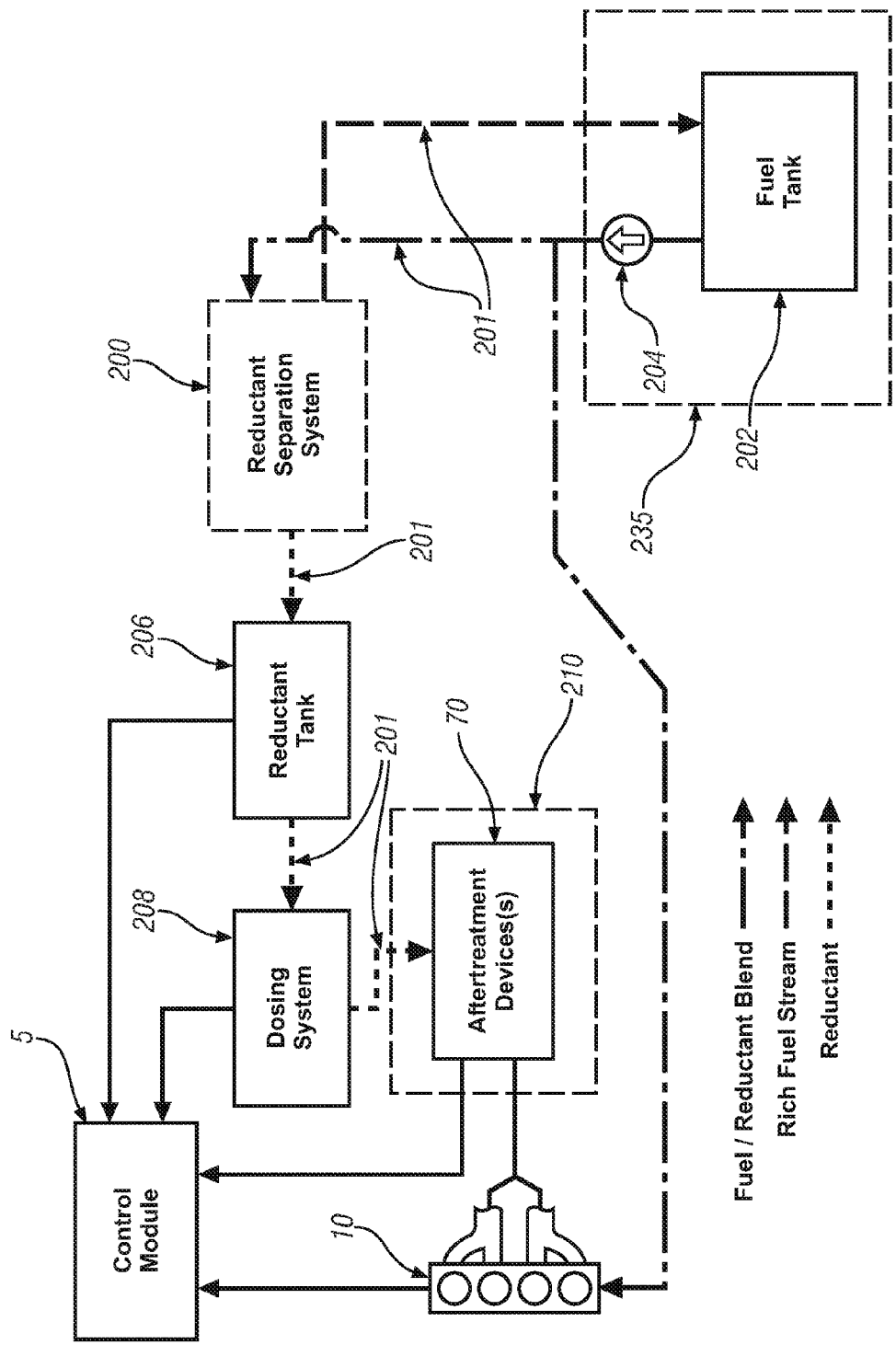
FIG. 1 is a schematic drawing of an exemplary aftertreatment system, in accordance with the present disclosure.

Referring now to the drawings, wherein the depictions are for the purpose of illustrating certain exemplary embodiments only and not for the purpose of limiting the same, FIG. 1 schematically shows an internal combustion engine 10, an accompanying control module 5, an exhaust aftertreatment system 210 comprising at least one aftertreatment device (Aftertreatment Device(s)) 70, a fuel storage and delivery system 235 including a fuel storage tank (Fuel Tank) 202 and a high pressure fuel pump 204, a reductant storage tank 206, a reductant separation system (Reductant Separation System) 200, a reductant injection device (Dosing System) 208, and fuel piping 201.

The fuel storage tank 202 is fluidly connected via the fuel piping 201 to supply a fuel/reductant blend to the engine 10 and the reductant separation system 200 and stores a rich fuel stream from the reductant separation system 200. The aftertreatment system 210 is fluidly connected to an exhaust system of the engine 10 and signally connected to the control module 5. The reductant injection device 208 is configured to inject reductant material into the exhaust gas feedstream upstream of at least one of the exhaust aftertreatment devices 210.

The fuel piping 201 fluidly connects the fuel storage tank 202 to the high pressure fuel pump 204, the high pressure fuel pump 204 to the reductant separation system 200, the reductant separation system 200 to the fuel storage tank 202, the reductant separation system 200 to the reductant storage tank 206, the reductant storage tank 206 to the reductant injection device 208, and the reductant injection device 208 to any of the plurality of exhaust aftertreatment devices 210. Reductant quantity stored in the reductant storage tank 206 may be monitored and communicated to the control module 5. As shown in FIG. 1, the high pressure fuel pump 204 is used for fuel distribution to the engine 10.

The engine 10 may be one of a compression ignition combustion engine, a spark-ignition combustion engine, and a premixed-charge compression ignition combustion engine. The engine 10 may be selectively operative in a plurality of combustion modes, including a controlled auto-ignition combustion mode, a homogeneous spark-ignition combustion mode, and a stratified-charge spark-ignition combustion mode. The engine 10 is selectively operative at a stoichiometric air/fuel ratio and at an air/fuel ratio that is primarily lean of stoichiometry. The disclosure can be applied to various internal combustion engine systems and combustion cycles, and is not limited thereby.

In one embodiment the engine 10 can be coupled to a transmission device to transmit tractive power to a driveline of a vehicle. A transmission can include a hybrid transmission including torque machines configured to transfer torque to a driveline.

The control module 5 executes algorithmic code stored therein to control actuators to control engine operation. The control module 5 is adapted to receive input signals from an operator to determine an operator torque request and from sensors indicating the engine speed and intake air temperature, and coolant temperature and other ambient conditions.

Control module, module, controller, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

In operation, the control module 5 monitors inputs from the aforementioned sensors to determine states of engine parameters. The control module 5 executes algorithmic code stored therein to control the aforementioned actuators. The control module 5 can operate to turn the engine on and off during ongoing vehicle operation, and can operate to selectively deactivate a portion of the combustion chambers or a portion of the valves through control of fuel and spark and valve deactivation. The control module 5 can control air/fuel ratio based upon feedback from sensors.

Fuel stored in the fuel storage tank 202 can comprise one of multiple fuel/reductant blends for use as fuel in the engine 10 and in the reductant separation system 200. Alcohol blended in with hydrocarbon fuel grades comprises a first fuel/reductant blend. Preferably, ethanol is blended in the hydrocarbon fuel. Ethanol blended hydrocarbon fuels can include higher ethanol blends (e.g. E80, E85), and neat ethanol (E99). Alternatively, any alcohol comprising one to five atoms of carbon may be used including any one of methanol, ethanol, propan-1-ol, propan-2-ol, butan-1-ol, butan-2-ol, 2-methylpropan-1-ol, 2-methylpropan-2-ol, pentan-1-ol and its isomers. The hydrocarbon fuel may be a mixture of one or more gaseous fuels such as natural gas, various reformates, and others which may be used in the implementation in accordance with the present disclosure. A second fuel/reductant blend comprises a urea/hydrocarbon fuel mixture.

During engine operation, the control module 5 monitors the reductant quantity in the reductant storage tank 206. When the reductant quantity recedes to less than a threshold quantity, the control module 5 may initiate a separating process to separate reductant, e.g., alcohol, from the fuel/reductant blend using the reductant separation system 200.

Figure 2:
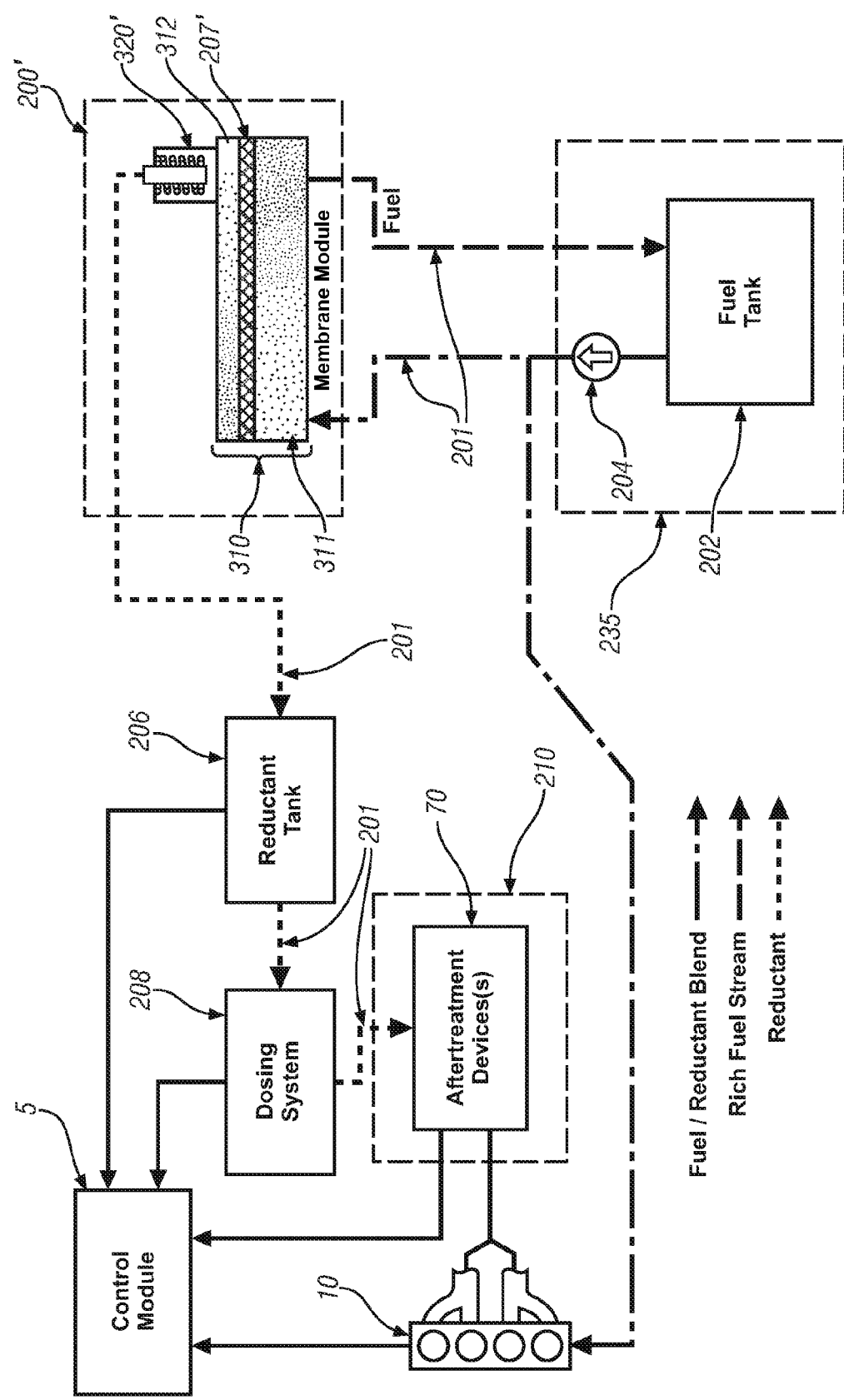
FIG. 2 is a schematic drawing of the exemplary aftertreatment system including a first embodiment of a reductant separation system, in accordance with the present disclosure.

FIG. 2 shows an embodiment of the reductant separation system 200' for separating reductant from the fuel/reductant blend. The reductant separation system 200' comprises a reductant separation module 310 and a semi-permeable membrane 207'. The high pressure fuel pump 204 generates a high pressure fuel/reductant stream creating a pressure gradient across the semi-permeable membrane 207' in the reductant separation module 310.

The reductant separation module 310 comprises a first portion 311 configured to collect the fuel/reductant blend and a second portion 312 configured to collect the separated reductant. In this embodiment, the fuel piping 201 fluidly connects the high pressure fuel pump 204 to the first portion 311 of the reductant separation module 310, the second portion 312 of the reductant separation module 310 to the reductant storage tank 206, and the first portion of the reductant separation module 310 to the fuel storage tank 202.

The semi-permeable membrane 207' is a porous, pervaporation membrane and is configured to permit gaseous reductant molecules, e.g., alcohol molecules, to permeate through the semi-permeable membrane. Pore sizes of the semi-permeable membrane are predetermined for a particular reductant and based upon molecule size and/or polarity of the particular reductant. For a fuel/reductant blend comprising hydrocarbon/alcohol, the polar alcohol molecules permeate through the semi-permeable membrane 207' with less resistance than the non-polar hydrocarbon molecules after the pressure gradient is applied across the semi-permeable membrane 207'.

Separating reductant from the fuel/reductant blend using the reductant separation system 200' comprises pumping a fuel/reductant stream from the fuel storage tank 202 to the reductant separation module 310 to separate reductant from the fuel/reductant blend. The reductant separation module 310 contains the semi-permeable membrane 207'. The fuel/reductant blend in the reductant separation module 310 is pressurized in the first portion 311 using the high pressure fuel pump 204. For a hydrocarbon/alcohol fuel/reductant blend, polar alcohol molecules permeate through the semi-permeable membrane 207' with less resistance than non-polar hydrocarbon molecules. The resulting diffusate permeating through the semi-permeable membrane 207' is an alcohol/hydrocarbon mixture comprising a greater alcohol concentration than the unpermeated retentate that can be used as a reductant. For example, a fuel/reductant blend comprising hydrocarbon with 10% alcohol blended therein has a resulting diffusate that is preferably greater than 50% alcohol. The diffusate is preferably stored in the reductant storage tank 206 for use in the reductant injection device 208. The retentate is a hydrocarbon rich mixture and is returned to the fuel storage tank 202. As shown in FIG. 2, a condenser 320' may be included to convert the gaseous diffusate into a liquid for storage in the reductant storage tank 206. Alternatively, the semi-permeable membrane 207' may be configured to permit liquid reductant molecules to permeate. In this case, the diffusate may be directly stored in the reductant storage tank 206 without using the condenser 320'.

Figure 3:
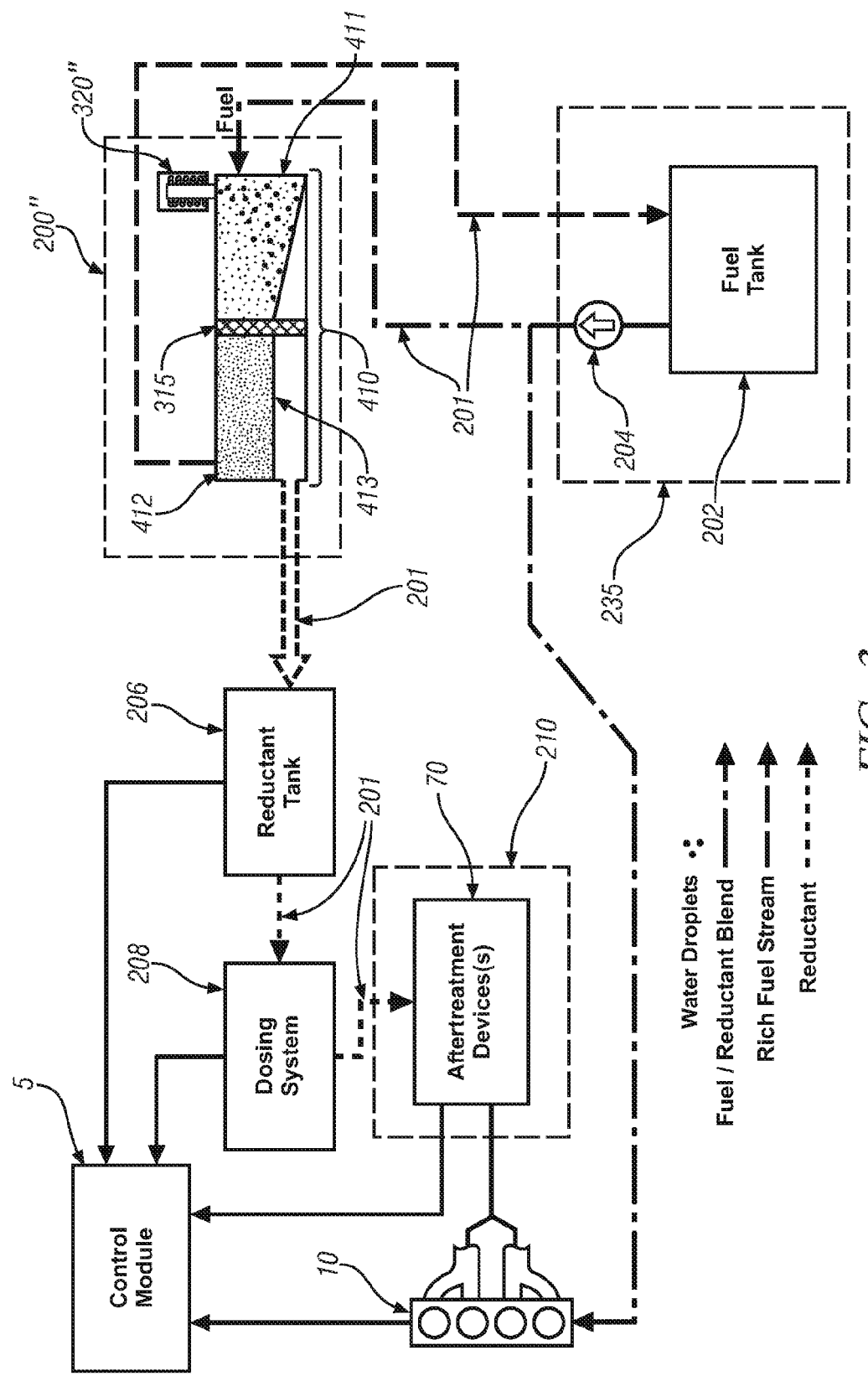
FIG. 3 is a schematic drawing of the exemplary aftertreatment system including a second embodiment of a reductant separation system, in accordance with the present disclosure.

FIG. 3 shows another embodiment of the reductant separation system 200" for separating reductant from the fuel/reductant blend comprising a separation tank 410 including a coalescing membrane 315, and a water dispensing device 320", e.g., a water vapor condenser. The water dispensing device 320" is configured to condense ambient water vapor to liquid water and dispense the liquid water into the separation tank 410. Alternatively, a serviceable water tank may be used in place of the water dispensing device 320". The serviceable water tank is preferably configured for periodic water refills by an operator.

The separation tank 410 comprises a first portion 411 configured to collect a mixture of water and the fuel/reductant blend and a second portion 412 configured to collect separated reductant. The coalescing membrane 315 partitions the separation tank 410 into first and second portions 411 and 412. The first portion 411 in the separation tank 410 stores the collected water/fuel mixture comprising dispensed liquid water from the water dispensing device 320" and the fuel/reductant blend from the fuel storage tank 202. The second portion 412 stores the reductant, i.e., the alcohol/hydrocarbon fuel mixture. The coalescing membrane 315 prohibits undissolved liquid water from permeating from the first portion 411 to the second portion 412. In one embodiment a second membrane 413 is included in the second portion 412. The second membrane 413 is configured to prevent water movement from a water-saturated alcohol layer to a water-saturated hydrocarbon rich layer. In one embodiment the second membrane 413 is a hydrophilic membrane that permits water to flow from the water-saturated hydrocarbon rich layer to the water-saturated alcohol layer.

Separating reductant from the fuel/reductant blend using the reductant separation system 200" comprises dispensing water into the first portion 411 of the separation tank 410 until exceeding a solubility threshold. The solubility threshold is based upon the grade and blend of the fuel/reductant blend in the fuel storage tank 202 and ambient temperature. For example, 0.5% water in the water/fuel mixture is preferable for a 10% ethanol blended fuel/reductant blend before adjusting for temperature conditions. When the solubility threshold is reached, the water promotes separation of the polar alcohol molecules and the non-polar hydrocarbon molecules. Both the non-polar hydrocarbon molecules and the polar alcohol molecules flow through the coalescing membrane 315 into the second portion 412 thereby separating from the undissolved liquid water. Denser water-saturated alcohol molecules accumulate towards a bottom of the second portion 412 and less dense water-saturated hydrocarbon rich molecules accumulate towards a top of the second portion 412. Thus, the second portion 412 contains a water-saturated hydrocarbon rich layer and a water-saturated alcohol layer. The water-saturated hydrocarbon rich layer primarily includes hydrocarbon molecules with a minimal quantity of polar alcohol molecules. The water-saturated alcohol layer includes the polar alcohol molecules and in one embodiment contains most of the dispensed water. The water-saturated hydrocarbon rich layer is returned to the fuel storage tank 202. The water-saturated alcohol layer is preferably stored in the reductant storage tank 206 for use by the reductant injection device 208.

Figure 4:
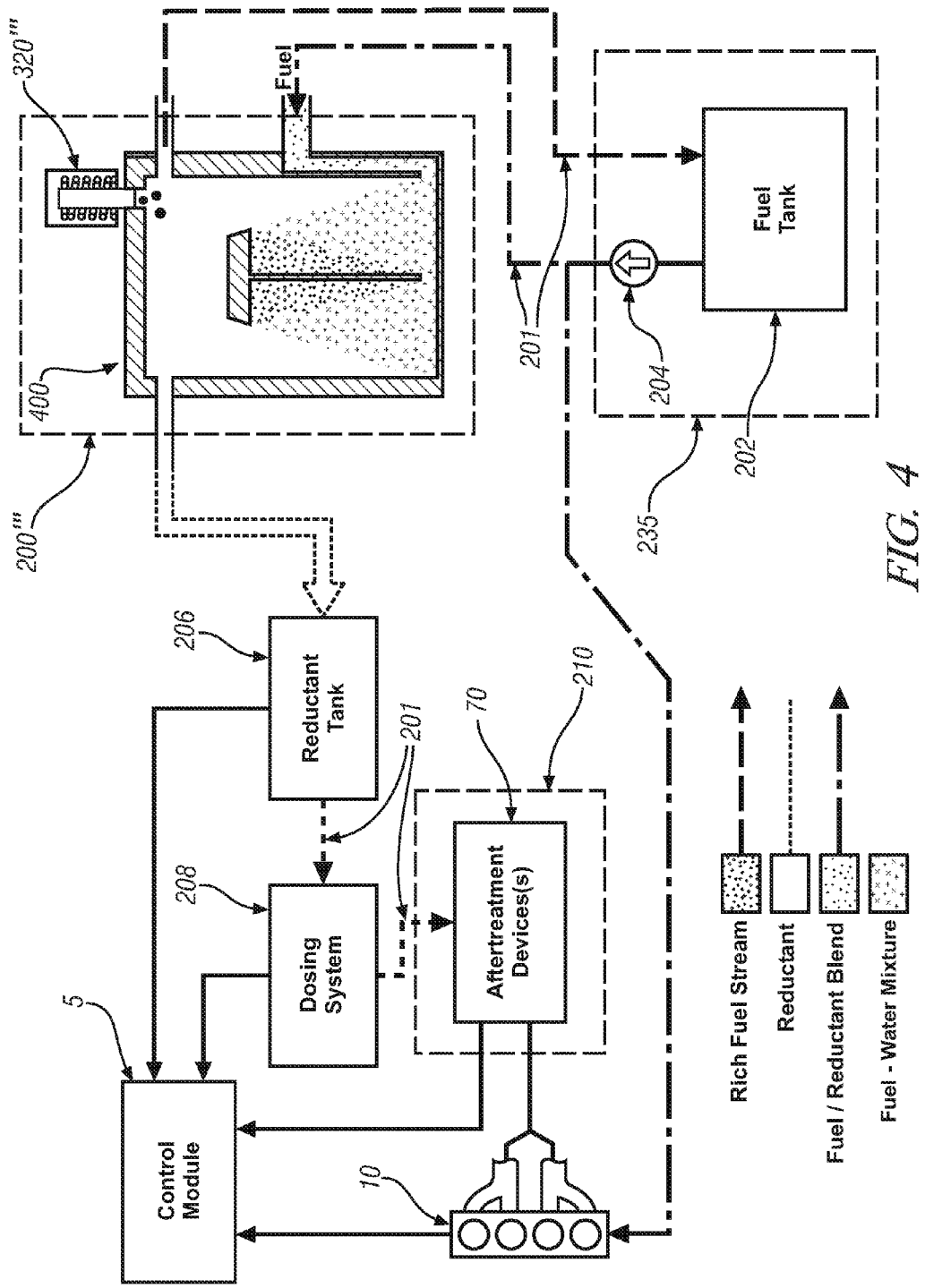
FIG. 4 is a schematic drawing of the exemplary aftertreatment system including a third embodiment of a reductant separation system, in accordance with the present disclosure.

FIG. 4 shows another embodiment of the reductant separation system 200''' for separating reductant from the fuel/reductant blend comprising an onboard centrifuge 400 and a condenser 320'''. The centrifuge comprises an outer port fluidly connected to the reductant storage tank 206 and a top port fluidly connected to the fuel storage tank 202 and configured to effect outgoing fuel flow. The fuel/reductant blend is pumped into a first side port from the fuel storage tank 202 and a second side port configured to permit the condenser to dispense water into the centrifuge from the condenser 320'''. Alternatively, a serviceable water tank may be used instead of the condenser 320'''. The serviceable water tank is preferably configured for periodic water refills by an operator. In operation, the centrifuge 400 spins the fuel/reductant blend pumped in from the fuel storage tank 202 through the first side port and water from the condenser 320''' to separate reductant from the fuel/reductant blend as described herein below.

Separating reductant from the fuel/reductant blend using the reductant separation system 200''' comprises dispensing liquid water from the condenser 320''' and pumping the fuel/reductant blend from the fuel storage tank 202 into the centrifuge 400. Water is dispensed until exceeding a solubility threshold. The solubility threshold is based upon the grade and blend of the fuel/reductant blend in the fuel storage tank 202 and ambient temperature. The resulting water/fuel/reductant blend mixture is spun within the centrifuge 400 to separate a non-polar gaseous water-saturated hydrocarbon rich mixture and a reductant, i.e., a polar alcohol-saturated water mixture. The polar alcohol-saturated water mixture coalesces along a perimeter of the centrifuge 400 while the non-polar gaseous water-saturated hydrocarbon rich mixture coalesces in a center of the centrifuge 400. The outer port permits the polar alcohol-saturated water mixture to flow out of the centrifuge 400 and into the reductant storage tank 206 for use in the reductant injection device 208. The top port permits the non-polar water-saturated hydrocarbon rich mixture to flow out of the centrifuge 400 and into the fuel storage tank 202.

Figure 5:
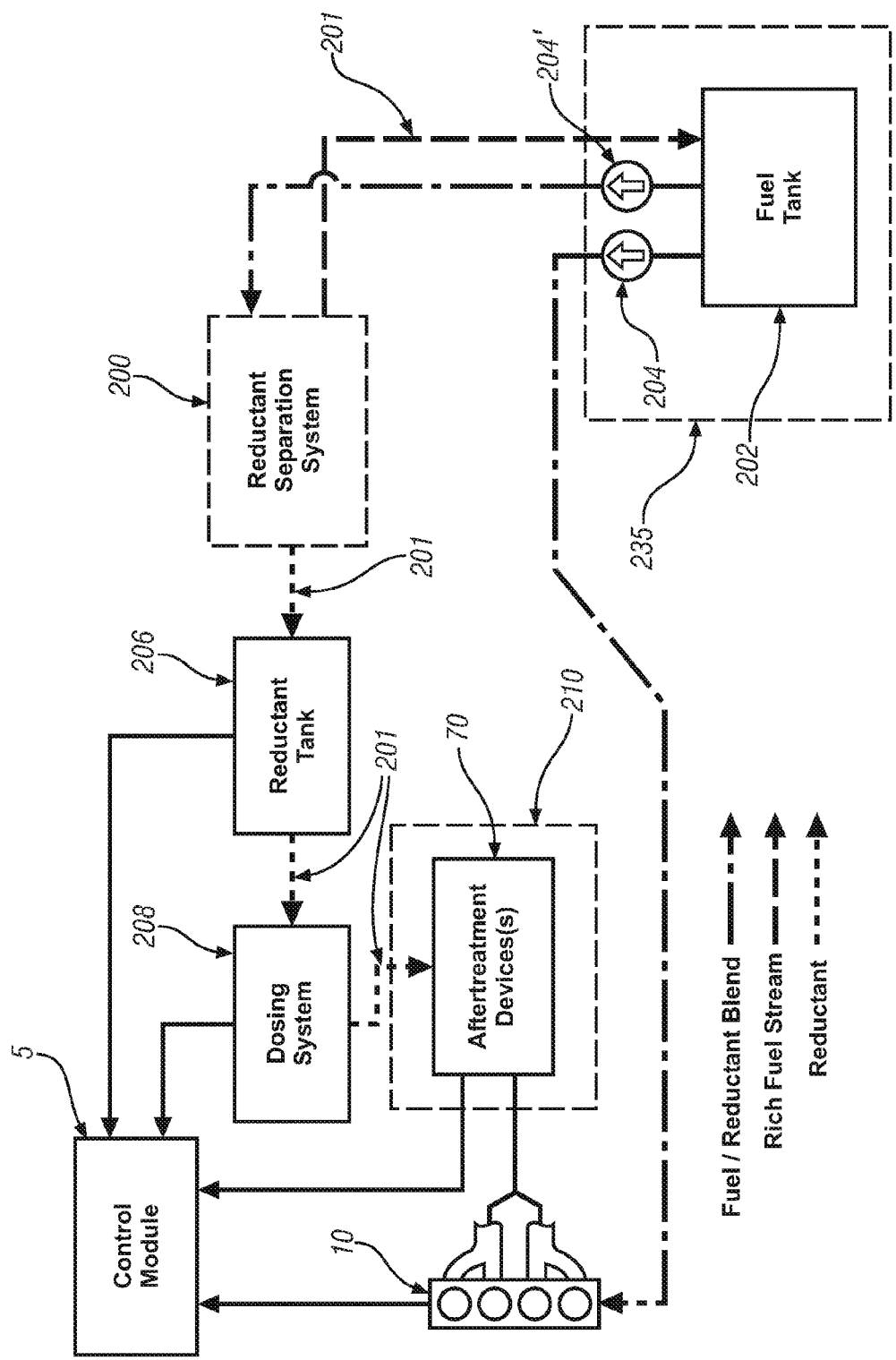
FIG. 5 is a schematic drawing of an alternate embodiment of the exemplary aftertreatment system including a reductant separation system, in accordance with the present disclosure.

FIG. 5 is a schematic drawing of an alternate embodiment of the exemplary aftertreatment system including a reductant separation system 200 and is analogous to the embodiments described hereinabove. In the embodiment shown, there is a second high-pressure fuel pump 204' that provides pressurized fuel to the reductant separation system 200 via a second high pressure fuel line.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for supplying a reductant into an exhaust gas feedstream upstream of an aftertreatment device for an internal combustion engine including a fuel storage and delivery system, the method comprising:
    storing a fuel/reductant blend in the fuel storage and delivery system;
    separating the reductant from the fuel/reductant blend;
    storing the reductant in a reductant storage tank; and
    injecting the reductant into the exhaust gas feedstream upstream of the aftertreatment device;
    wherein separating the reductant from the fuel/reductant blend comprises equipping the fuel storage and delivery system with a reductant separation system and dispensing liquid water and the fuel/reductant blend into the reductant separation system;
    wherein dispensing liquid water into the reductant separation system occurs until a solubility threshold is achieved.

2. The method of claim 1, wherein separating the reductant from the fuel/reductant blend further comprises:
    equipping the fuel storage and delivery system with the reductant separation system including a reductant separation tank comprising first and second portions partitioned by a coalescing membrane;
    dispensing the liquid water and the fuel/reductant blend into the first portion of the reductant separation tank to promote separation of the fuel/reductant blend into polar molecules comprising the reductant and non-polar molecules comprising the fuel;
    passing the polar and non-polar molecules through the coalescing membrane into the second portion of the reductant separation tank; and
    returning the non-polar molecules to the fuel storage and delivery system.

3. The method of claim 2, wherein separating the polar and non-polar molecules occurs after the solubility threshold is achieved.

4. The method of claim 2, wherein the non-polar molecules comprises gaseous water-saturated hydrocarbon molecules.

5. The method of claim 2, wherein the polar molecules comprises water-saturated alcohol molecules.

6. The method of claim 1, wherein the reductant separation system comprises a centrifuge, and wherein separating reductant from the fuel/reductant blend comprises:
    spinning the centrifuge to coalesce the reductant along a perimeter of the centrifuge and coalesce the fuel into a center portion of the centrifuge;
    permitting the reductant to flow out of the centrifuge using a first port; and
    permitting the fuel to flow out of the centrifuge using a second port.

7. The method of claim 1, wherein the fuel in the fuel/reductant blend comprises hydrocarbon molecules and the reductant in the fuel/reductant blend comprises an alcohol.

8. The method of claim 1, wherein fuel in the fuel/reductant blend comprises hydrocarbon molecules and the reductant in the fuel/reductant blend comprises urea.

9. Method for supplying a reductant into an exhaust gas feedstream upstream of an aftertreatment device for an internal combustion engine including a fuel storage and delivery system, the method comprising:
    separating the reductant from the fuel/reductant blend with a reductant separation system;
    storing a fuel/reductant blend in the fuel storage and delivery system; and
    injecting the separated reductant in the exhaust gas feedstream upstream of the aftertreatment device;
    wherein separating the reductant from the fuel/reductant blend with the reductant separation system comprises dispensing liquid water and the fuel/reductant blend into the reductant separation system; and
    wherein dispensing the liquid water into the reductant separation system occurs until a solubility threshold is achieved.

10. The method of claim 9, wherein the reductant separation system comprises a semi-permeable membrane for separating reductant from the fuel/reductant blend, the method further comprising pumping the fuel/reductant blend across the semi-permeable membrane to separate reductant from the fuel/reductant blend.

11. The method of claim 9, wherein the reductant separation system comprises a first and second portions and a coalescing membrane, and wherein separating reductant from the fuel/reductant blend comprises:
    dispensing the liquid water and the fuel/reductant blend into the first portion to promote separation of polar and non-polar molecules;
    flowing the polar and non-polar molecules through the coalescing membrane and into the second portion; and
    returning the non-polar molecules to the fuel storage and delivery system.

12. The method of claim 9, wherein the reductant separation system comprises a centrifuge, and wherein separating reductant from the fuel/reductant blend comprises:
    dispensing the liquid water and the fuel/reductant blend into the centrifuge;
    spinning the centrifuge;
    coalescing the reductant along a perimeter of the centrifuge;
    coalescing fuel in a center of the centrifuge;
    permitting the reductant to flow out of the centrifuge using a first port; and
    permitting the fuel to flow out of the centrifuge using a second port.

13. The method of claim 9, wherein the reductant in the fuel/reductant blend comprises an alcohol.

14. System for supplying a reductant into an exhaust gas feedstream upstream of an aftertreatment system for an internal combustion engine including a fuel storage and delivery system, the system including:
    a reductant separation system for separating reductant from the fuel/reductant blend and fluidly connected to the fuel storage and delivery system;
    a reductant storage tank fluidly connected to the reductant separation system; and
    a reductant injection device fluidly connected to the reductant storage tank and configured to inject the reductant into the exhaust gas feedstream upstream of the aftertreatment device;
    wherein the reductant separation system is configured to dispense liquid water and the fuel/reductant blend into the reductant separation system; and
    wherein the reductant separation system is configured to dispense liquid water into the reductant separation system until a solubility threshold is achieved.

15. The system of claim 14, wherein the reductant separation system comprises a reductant separation tank fluidly connected to the fuel storage and delivery system and the reductant storage tank, and including a semi-permeable membrane.

16. The system of claim 15, wherein the reductant separation tank comprises a first portion configured to collect the fuel/reductant blend and second portion configured to collect a separated reductant.

17. The system of claim 14, wherein the reductant separation system comprises:
    a separation tank fluidly connected to the fuel storage and delivery system and the reductant storage tank;
    a coalescing membrane disposed within the separation tank; and
    a water dispensing device fluidly connected to the separation tank.

18. The system of claim 14, wherein the reductant separation system comprises:
    a centrifuge fluidly connected to the fuel storage and delivery system and the reductant storage tank; and
    a condenser fluidly connected to the centrifuge;
    wherein the centrifuge comprises an outer port fluidly connected to the reductant storage tank, a top port fluidly connected to the fuel storage tank and configured to effect outgoing fuel flow, a first side port configured to effect fuel intake flow, and a second side port configured to permit the condenser to dispense water into the centrifuge.

* * * * *